Figure 1:
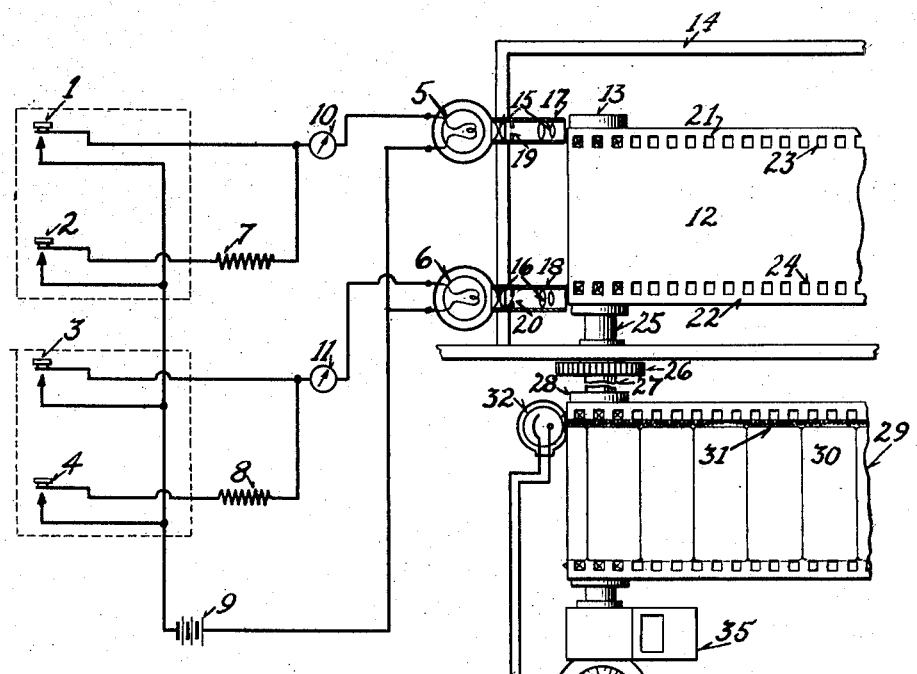

Dec. 3, 1935.  W. S. HALSTEAD  2,022,665
PLASTIC SOUND REPRODUCTION SYSTEM
Filed Feb. 3, 1931   3 Sheets-Sheet 1

Inventor
William S. Halstead
By
his Attorney

Dec. 3, 1935. W. S. HALSTEAD 2,022,665
PLASTIC SOUND REPRODUCTION SYSTEM
Filed Feb. 3, 1931 3 Sheets-Sheet 2

Inventor
William S. Halstead.
By his [signature]
Attorney

Dec. 3, 1935.  W. S. HALSTEAD  2,022,665
PLASTIC SOUND REPRODUCTION SYSTEM
Filed Feb. 3, 1931  3 Sheets-Sheet 3

Inventor
William S. Halstead
By (signature)
His Attorney

Patented Dec. 3, 1935

2,022,665

UNITED STATES PATENT OFFICE 2,022,665

PLASTIC SOUND REPRODUCTION SYSTEM

William Storm Halstead, White Plains, N. Y.

Application February 3, 1931, Serial No. 513,125

14 Claims. (Cl. 179—100.3)

My invention relates to improved methods or systems for reproducing sounds used in connection with talking motion pictures.

It is a general object of my invention to provide means whereby the sounds synchronously associated with a motion picture may be reproduced in a realistic manner from the particular locality of the sound source as pictorially indicated on the screen.

It is a specific object of my invention to provide means which may be employed in combination with present conventional sound motion picture films and apparatus to automatically and synchronously effect selective energization of a particular sound reproducer or a group of sound reproducers disposed at different given locations with respect to a motion picture screen as determined by the location of the sound source pictorially indicated on the screen.

Another object of my invention is the provision of an apparatus of this type which is relatively simple and comparatively inexpensive to construct and operate and highly efficient in operation.

My invention resides substantially in the combination, construction, arrangement and relative location of parts and circuital connections as will be clearly described in the following specification and pointed out in the appended claims.

Figure 2:
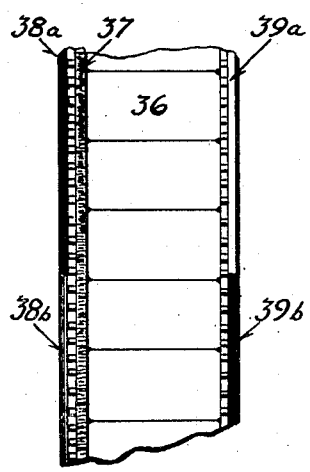
Figure 3:
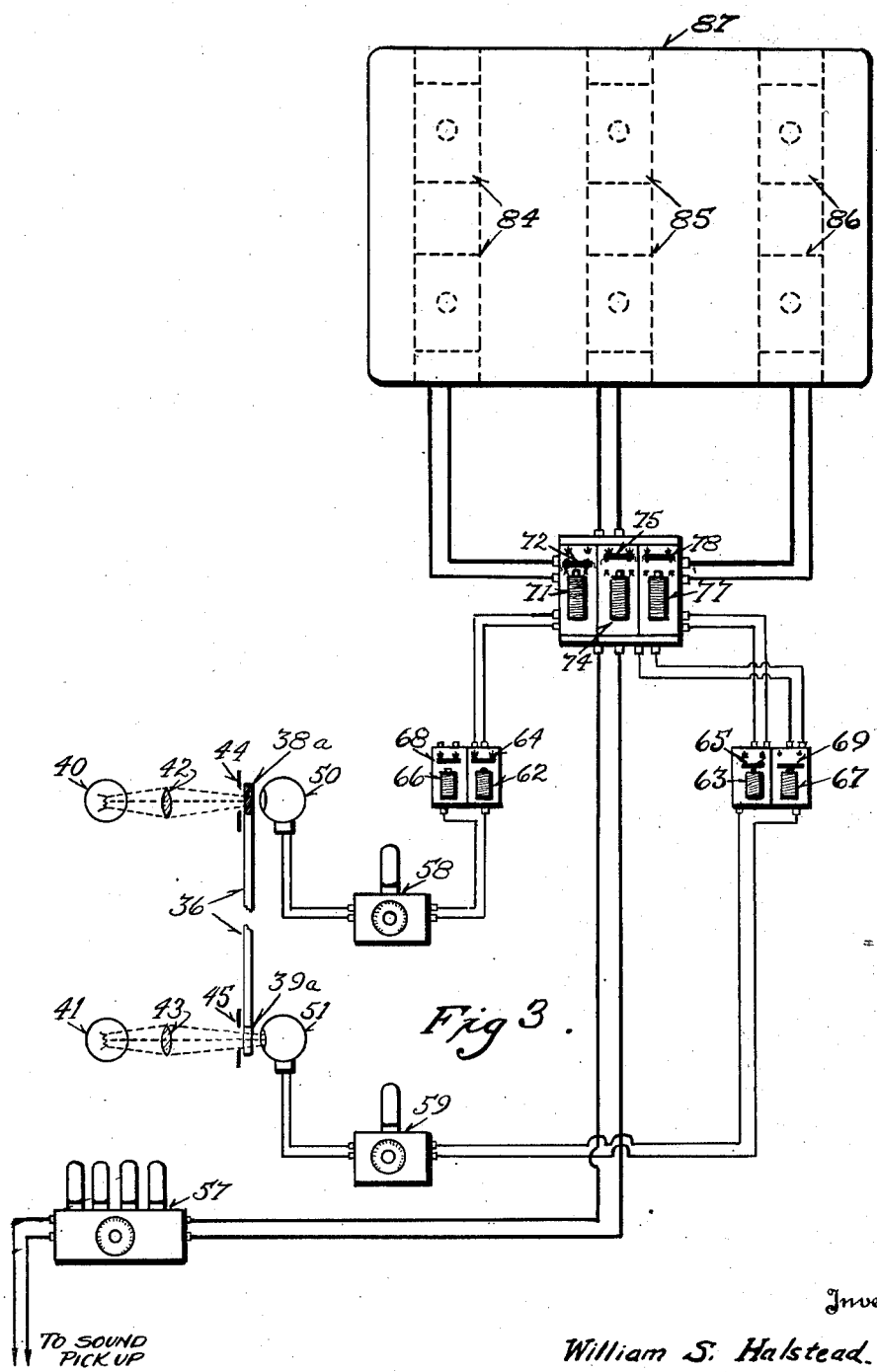
Figure 4:
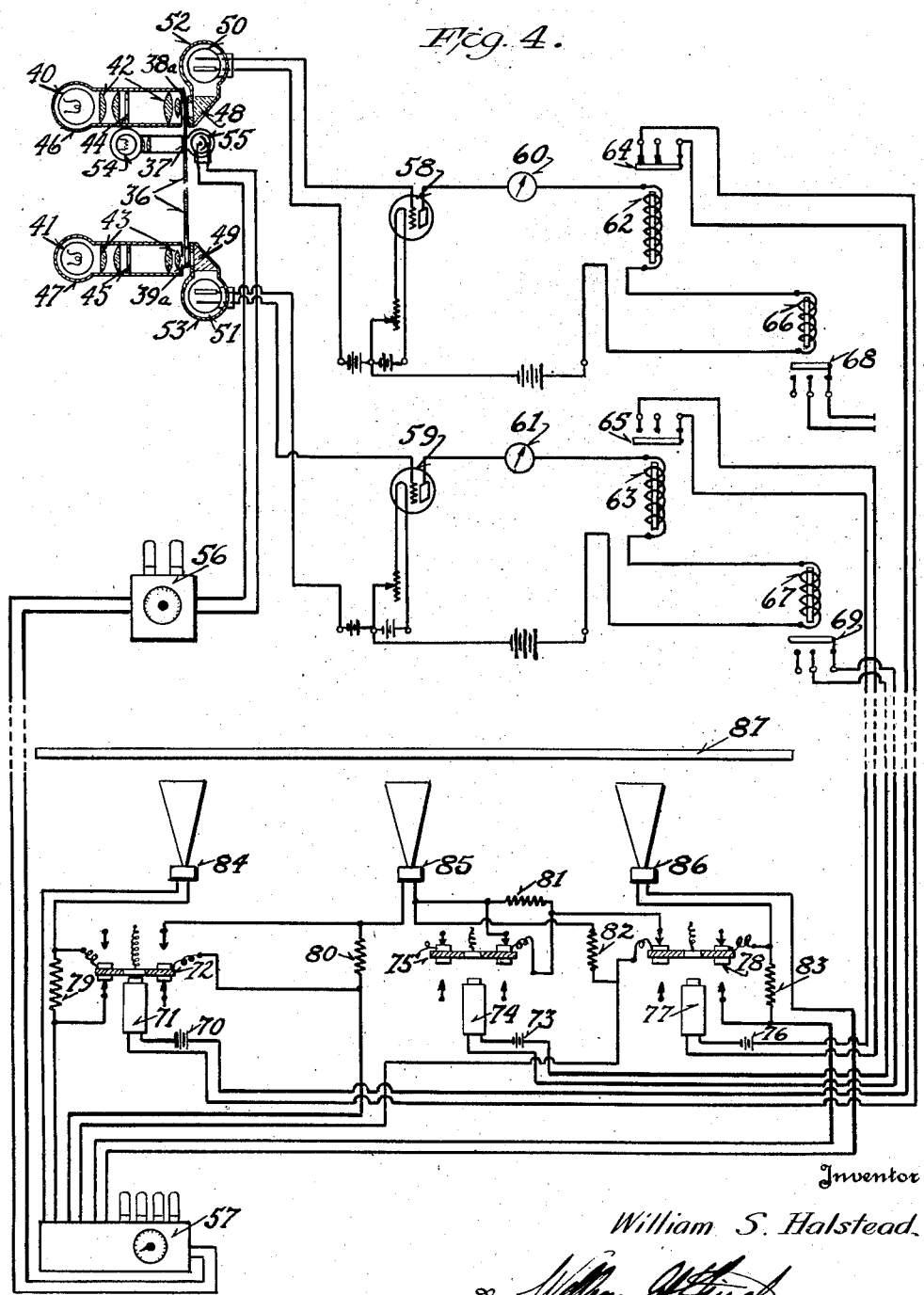

Referring to the drawings in which the same reference numerals will be used throughout the several views to indicate the same or similar parts:

Figure 1 is a diagrammatic view of the apparatus and circuits employed in the illustrated embodiment of my invention for exposing sections of a light-sensitive film as determined by the pictorial and sound records of a motion picture film moving in synchronization with the light-sensitive film; Fig. 2 is a front elevational view of one form of completed positive film, employed in the illustrated embodiment of my invention, showing definite variations in light intensity photographed at a present preferred location on the margins of the film, each of said variations being indicative of changes in the location of the sound source as indicated by the pictorial record on an associated motion picture film; Fig. 3 is a diagrammatic view, with the positive film in enlarged lateral cross-section, showing a schematic arrangement of the different parts employed in the illustrative system herein described to obtain plasticity or localization of the reproduced sound; and Fig. 4 is a diagrammatic view, with the film in lateral cross-section, of the circuit and parts used in the illustrated embodiment of my invention to obtain plastic sound reproduction or sound localization.

Referring to Fig. 1, keys 1, 2, 3 and 4 are used to control the light from lamps 5 and 6 which expose the margins 21 and 22, respectively, of a light-sensitive film, 12. Resistances 7 and 8, respectively, are connected in series with keys 2 and 4 and battery 9 to reduce the current supplied to lamps 5 and 6, respectively, so that their illuminating power is decreased to a definite degree. Ammeters 10 and 11 are provided to give an exact measurement of the current in the circuits leading to lamps 5 and 6, respectively. Light from the two lamps, 5 and 6, passes through the lens systems 15 and 16, respectively, and light slits 19 and 20, respectively, to the margins 21 and 22, respectively, of the sensitive film 12, enclosed in a light-tight housing 14. Sensitive film 12, by means of sprocket holes 23 and 24, sprocket 13 and coupling means such as sprocket shaft 25, coupling gears 26, and a coupling shaft 27 attached to sprocket 28 of a motion picture viewing device or projector, is moved in synchronization with a motion picture film 29 carrying sound and pictorial records. A speed indicating device 35a may be connected to sprocket 28 as indicated to give an exact indication of the speed with which films 29 and 12 are moving. A frame or footage counter 35 may also be connected to sprocket 28 as indicated to facilitate the locating of changes in particular scenes or actions photographed in the frames such as 30, of film 29. Synchronized sound from sound track 31 is reproduced in customary manner by photoelectric cell 32, thermionic amplifier 33 and loud speaker or head set 34. Synchronized sound from a disk record or other synchronized sound medium may be used in place of sound from the sound track 31.

An operator controlling keys 1, 2, 3, and 4, watches the action, photographed on a positive film 29, as it is shown in a viewing device or on a screen. At the same time, he hears the sounds synchronously associated with the action. If the action takes place at the left side of the screen, for example, he depresses key 3 which lights lamp 6 to full brilliancy thus fully exposing margin 22 of the sensitive film for a length corresponding to the duration of action in which the source of sound should be localized at the left of the screen. As the action moves to other parts of the screen, the operator may, by releasing and depressing the keys 1, 2, 3 and 4 in their proper order, control the degree of exposure of the two margins 21 and 22 of the film 12. It is apparent that these various exposed portions of the film 12, hereinafter designated as loud speaker selection control tracks, are definitely related to the pictorial and sound records of positive film 29.

After the full length of sensitive film 12 has been exposed in accordance with the pictorial and sound records of film 29, it is developed and further processed in conventional manner, whereupon it may be employed in well known combination with a negative from which positive film 29 was made to form a master as is the present practice in making motion picture films with sound accompaniment. Prints, such as 36 shown in Fig. 2, will then carry the loud speaker selection control tracks, such as 38a and 39a, as well as the customary sound track 37 and the associated pictorial record.

Reference is now made to Figs. 3 and 4 which illustrate schematically the apparatus and circuits used to effect plasticity or localization of sound reproduction as determined by control tracks such as 38a and 39a of film 36. In the illustrated embodiment of my invention schematically shown in Fig. 3, positive film 36, carrying a pictorial record, the associated sound track 37, and loud speaker selection control tracks such as 38a and 39a, is drawn through a gate (not illustrated) in front of two photoelectric cells 50 and 51, arranged at a fixed point in a motion picture projector. Light from exciting lamps 40 and 41 passes through the lens systems 42 and 43 and light slits 44 and 45 to the control tracks such as 38a and 39a of the film 36 schematically shown in enlarged lateral cross-section. Tracks 38a and 39a thereby control the passage of light rays from lamps 40 and 41 to the photoelectric cells 50 and 51, respectively, which in well-known manner change the light variations reaching them into variations in electric current as determined by the exposure variations of the control tracks. Thermionic amplifiers, 58 and 59, such as three electrode vacuum tubes increase the current variations to operating proportions sufficient to operatively energize relay coils 62 and 66, and 63 and 67 disposed in proximity to the motion picture projector and connected in the plate circuits of the amplifiers 58 and 59, respectively, as is clearly shown in the related section of Fig. 4 to be described hereinafter. Relay armatures 64 and 65, actuated by energization of relay coils 62 and 63, respectively, are adjusted to respond to a fraction of the current required to operate armatures 68 and 69, actuated by relay coils 66 and 67, respectively. The contacts of armature 64, as is clearly shown in Fig. 4, control the energization of relay coil 71, disposed in proximity to loud speakers 84. Relay armature 68, shown without circuit connections, may be employed for the selection of auxiliary speakers, not illustrated disposed at a selected location and especially suited for reproduction of such sounds as thunder or gun fire. The contacts of armatures 65 and 69 actuated by relay coils 63 and 67, respectively, control the energization of relay coils 77 and 74 respectively. Relay coil 71 controls the actuation of armature 72, the contacts of which act to increase or decrease the operating current delivered to the left-hand loud speakers, 84, by shunting or inserting a resistance 79 or other current controlling device, placed in series with loud speakers 84 and the output circuit of sound amplifier 57 which can be more clearly understood from a study of this portion of the operating circuits as illustrated in Fig. 4. Relays 77 and 74 in like manner increase or decrease the current delivered to the center or the right-hand speakers 85 and 86 respectively. The selective energization of any or all of the various loud speakers is thus controlled, resistances or other current regulating devices being automatically shunted or inserted in the speaker circuits by the selective action of the relays in accordance with the control action of the tracks 38a and 39a. It is understood that compensating impedances, not illustrated, may likewise be shunted or inserted in the loud speaker circuits in order to maintain a constant impedance value at the terminals of sound amplifier 57 regardless of the number of loud speakers in operation at any given time.

It will now be understood from the foregoing description when read in connection with the various figures of the respective drawings how a predetermined loud speaker or plurality of loud speakers is selected at a specified predetermined instant at a specified point of the film as determined by the control track variations so that any or all of the loud speakers 84, 85 or 86 are fully energized by the sound amplifier circuit 57 in accordance with the location of the depicted sound source.

To better illustrate my invention, let us assume that the film now being projected is showing a group of men engaged in conversation. As each member of the group participates in the conversation, it will be seen by referring to Figs. 3 and 4 that any or all of the loud speakers 84, 85 or 86 will be connected into the circuit depending upon the position or positions of the person or persons participating in the conversation. Another illustration might show the approach of a moving train and as the train advances from one side of the screen to the other, the sound of such an approach will be realistically reproduced first from speakers 84 then from speakers 85 and then from speakers 86, or vice versa.

Referring to Fig. 4, which shows circuit details of a sound reproduction system such as that just outlined, exciting lamps 40 and 41, lens systems 42 and 43, light slits 44 and 45 are enclosed in housings 46 and 47. Reflecting prisms 48 and 49, employed in the illustrative embodiment of the invention, direct the light rays from lamps 40 and 41 to photoelectric cells 50 and 51, enclosed in housings 52 and 53, respectively. Photoelectric cells 50 and 51 are connected to thermionic amplifiers 58 and 59 respectively. Milliammeters 60 and 61 give an exact indication of the plate current in the amplifiers 58 and 59 respectively. Relay coils 62 and 66 are connected as previously outlined in the plate circuit of amplifier 58. Relay coils 63 and 67 are connected in the plate circuit of amplifier 59. Relay armatures 64 and 68 are actuated by energization of relay coils 62 and 66, respectively, the contacts of armature 64 being connected so as to control energization of relay coil 71, disposed in series with the armature contacts and a source of E. M. F. 70 as shown. The contacts of armature 68, illustrated without circuit connections, may be employed to select an auxiliary group of speakers, as heretofore suggested. Armatures 65 and 69 are actuated by energization of relay coils 63 and 67 respectively, the contacts of the armatures being connected as shown to control energization of relay coils 77 and 74 respectively, each disposed in series with its respective control armature contacts and source of E. M. F. such as batteries 73 and 76. The contacts of armature 72, which is actuated by relay coil 71, are connected to the loud speakers 84 and 85 and to the resistors 79 and 80 associated with loud speakers 84 and 85 respectively, as illustrated. The contacts of armature 75, which is actuated by relay coil 74 are connected to loud speaker 85, and to the resistors 80, 81 and 82 associated with loud speaker 85. The contacts of armature 78, which is actuated by relay coil 77 are connected to loud speakers 85 and 86 and to the resistors 82 and 83 associated with loud speakers 85 and 86. The speakers 84, 85 and 86 are preferably located as shown on the left of, in the center of and to the right of the screen 87. A conventional sound film optical system, comprising an exciting lamp 54, lens system and light slit, the latter not shown, is used in well-known connection with sound track 31, photoelectric cell 55 and amplifiers 56 and 57 to drive speakers 84, 85 and 86. Other sound systems, such as sound-on-disk may be used interchangeably, since amplifiers 56 and 57 may be employed to amplify the output energy from any form of sound pick-up device.

While from the above description and drawings, I have disclosed one form which my invention may take, I am aware that other modifications and changes in construction will be obvious to those skilled in the art and may be made without departing from the spirit and scope of my invention. I do not, therefore, wish to be restricted except by the scope of my appended claims.

Having thus described my invention, what I desire to protect and secure by United States Letters Patent is:

1. In a sound localization system, a source of light, means for producing definite variations in the light intensity from the source of light by definite predetermined stages in accordance with changes in the relative location of depicted sources of sound photographically recorded on a monitoring film carrying pictorial and sound records of a scene previously photographed, a light-sensitive film, means for moving the two films in synchronization, means to direct light rays from the source of light to produce on the light-sensitive film a continuous photographic record of said definite variations in light intensity from said source of light, and photoelectric means for utilizing said continuous record of variations in light intensity to electrically select as a source of reproduced sound a given loud speaker or a plurality of loud speakers disposed in the locality of the depicted sound source shown on a motion picture screen.

2. In a sound localization system, two independent and separate sources of light, several selective electric keys for producing definite variations in the intensity of illumination from each source of light, said keys being manually controlled by a monitoring operator, a photographically sensitive film, a positive monitoring film carrying a pictorial record of action previously photographed, a synchronous sound record associated with the action photographed, means for driving in synchronization the two films and the sound record associated with the action on the monitoring film, means to project light of definite, pre-determined intensity of illumination from said sources to produce on the light-sensitive film two continuous photographic records in which changes in the densities of the exposures are in direct relation to and in accordance with changes in the relative location of the depicted sources of sound photographed on said monitoring film, and photoelectric means for employing said continuous record of changes in exposure densities to electrically select for operation a given loud speaker or a plurality of sound reproducers in accordance with changes in the relative location of the depicted sound sources.

3. In a sound localization system, the combination of two separate sources of light whose respective pre-determined brilliancies are varied by a plurality of selective keys manually controlled by a monitoring operator, two light slits, the lens systems associated with said light sources and slits, a photographically sensitive film on whose outer margins the light rays from said sources are projected with brilliancies or intensities in direct relation to and in accordance with changes in the locality of action and sound source depicted on a monitoring film carrying a pictorial record of a scene previously photographed, the synchronous sound record associated with said monitoring film, means for driving the two films in synchronization, and photo-electric means for utilizing a positive print of said sensitive film on which changes in light intensity are recorded to selectively control the operation of a given sound reproducer or a plurality of sound reproducers in accordance with the relative location of the source of sound depicted on said monitoring film.

4. In a sound motion-picture projection system, the combination of a plurality of directional sound reproducers, or projectors, a motion picture film having a correlated synchronous sound record, said motion picture film carrying a continuous photographic record whose variations in density are indicative of and in accordance with changes in locality of the sound relative to the depicted sound source on the screen, and photoelectric means for selecting the respective sound reproducers, or projectors, according to the locality as governed by the variable density record of sound source changes, including a photoelectric cell with associated amplifier and relays, a light slit and a source of light.

5. In a sound motion-picture projection system, a sound motion-picture film carrying a continuous photographic record whose density varies in definite steps in accordance with and in direct relation to the changes in locality of the sources of sound as indicated by the projected picture, and including a light source, a lens system, a light slit, a photoelectric cell and associated cooperating selective relays connected with a plurality of sound reproducers arranged at different parts of a motion picture screen, said relays being so connected that their cooperative operation selects a particular sound reproducer or a plurality of sound reproducers in accordance with the location of sound as indicated by the projected picture.

6. In a sound motion picture projection system, the combination of a battery of sound reproducers, a motion picture film having a correlated synchronous sound record, said motion picture film having on its outer margin a continuous light-change photographic record whose variations in density are indicative of changes of locality of a source of sound relative to the motion picture scene, and photo-electric means for selecting the respective sound reproducers in accordance with the locality of the sound source as determined by the variations in the density of said light-change record, including a light source, a light slit, a lens system, and a photoelectric cell connected with a series of cooperating relays associated with and controlling the operation of a particular sound reproducer or a plurality of sound reproducers in accordance with the depicted location of the source of sound.

7. In a sound motion picture projection system, the combination of a motion picture film carrying on each outer margin, in the space included between the sprocket holes and the edge of the film, a continuous photographic record of variable density, said variations in density being indicative of changes of locality of the source of sound relative to the motion picture screen, and including two separate light sources, two lens systems, two light slits through which light rays from said light sources are directed by said lens systems to the two light-change records on each margin of the film opposite to that on which the light sources are placed, a plurality of relays controlled by each photoelectric cell in accordance with variations in density of each of said light-change records, the volume reducing resistors or impedances associated with said relays, and a plurality of sound reproducers arranged at different parts of a motion picture screen.

8. A sound motion picture projection system for localizing sound reproduction at different parts of a motion picture screen, including a motion picture film having a synchronous correlative sound record and carrying on each outer margin a continuous photographic record varying in its exposure densities according to the changes in locality of the sound relative to the depicted sound source on the screen, two light sources, two lens systems for directing light from said sources through two light slits onto the marginal light-change records, two photoelectric cells for receiving the light impulses whose received intensities vary with the varying exposure densities, amplifiers to increase the intensities of the varying electric impulses, and electric relays, each operated by a predetermined value of current in direct relation to a particular exposure density, for selecting a reproducer disposed in the locality of the depicted sound source on the screen.

9. In a motion-picture sound localization system, a monitoring film carrying pictorial and sound records of a scene previously photographed, a photographically-sensitive film moving in synchronization with said monitoring film, a source of light, means for producing on said photographically-sensitive film a continuous photographic record of changes in light intensity from said light source, said changes in light intensity being in distinct steps and in direct relation to and in accordance with changes in the location of the action and sounds recorded on said monitoring film, and photoelectric means for utilizating said continuous record of changes in light intensity to electrically select a given sound reproducer or a plurality of sound reproducers in accordance with the relative location of the associated sounds recorded on a projected duplicate of said monitoring film.

10. In a motion-picture sound localization system, the combination of a source of light, means for producing a continuous photographic record of definite changes in the intensity of illumination from said source of light on a photographically-sensitive moving film said changes in light intensity being in definite steps, each of said steps being in direct relation to and indicative of the location of the action and sounds of the subjects in a photographed scene, and photoelectric means for utilizing said continuous photographic record of changes in light intensity to electrically select a given loud speaker or a plurality of loud speakers in accordance with the relative location of the action and sounds of the photographed scene.

11. In combination with a sound reproducing system synchronously associated with a motion picture film depicting sources of sound, a continuous photographic photoelectric-cell control record of variable density, variations in the density being such that the changes from one density to another are in definite correlated steps, the degree of density of each of said steps being indicative of and definitely related to a particular depicted location of sound source photographically recorded on said motion picture film.

12. In combination with a sound reproducing system synchronously associated with a motion picture film, pictorially indicating the source of sound, a continuous photographic photoelectric-cell control record of variable density, variations in the density being such that the changes from one density to another are in definite correlated steps, the degree of density of each of said steps being indicative of and definitely related to a particular location of a sound source as pictorially indicated by said motion picture film, and photoelectric means to utilize said photoelectric-cell control record of variable density to effectively select as a source of reproduced sound a particular loud speaker or a plurality of loud speakers disposed in the locality of the pictorially indicated sound source on the motion picture screen.

13. In combination with a sound reproducing system synchronously associated with a motion picture film depicting the sources of sound, a continuous photographic photoelectric-cell control record of variable density, variations in the density being such that changes from one density to another are in definite correlated steps, the degree of density of each of said steps being indicative of and definitely related to a particular depicted location of sound source as indicated by said motion picture film, and photoelectric means to utilize said photoelectric-cell control record of variable density to effectively select as a source of reproduced sound a particular loud speaker or a plurality of loud speakers disposed in the locality of the sound source as shown on the motion picture screen, including a source of light, the lens system associated with said source of light, an aperture through which rays of light from said source of light are directed by said lens system, said lens system and aperture being disposed so they effectively direct and limit the passage of light rays from said source of light to said variable density photoelectric-cell control record, a photoelectric cell disposed so that it receives light rays of varying intensity from said source of light in accordance with variations in the density of said variable density control record, said variations in density producing corresponding variations in electric current from said photoelectric cell, and a series of cooperating electric relays, each operated by a definite predetermined value of current in direct relation to a particular control film density, the armatures of said relays being so connected that the operation of a particular relay or group of relays as determined by a particular control film density selects as a source of reproduced sound a particular sound reproducer or a group of loud speakers disposed in the locality of the depicted sound source or sources on the screen.

14. In a sound motion picture projection system, the combination of a plurality of loud speakers, a motion picture film having a correlated synchronous sound track, said motion picture film also carrying a continuous photographic loud speaker selection control track having variations in light intensity therein, said variations being correlated with and indicative of changes in the depicted sound source as recorded on said motion picture film, and photoelectric control means for selecting a particular loud speaker, or speakers, as governed by said correlated light variations, including a photoelectric cell, an amplifier actuated by said cell, a loud speaker selecting device, a light slit, associated optical system, and a source of light.

WILLIAM STORM HALSTEAD.